(12) United States Patent
Pelfrey et al.

(10) Patent No.: US 10,088,054 B2
(45) Date of Patent: Oct. 2, 2018

(54) IN-LINE SERVICABLE SHUTOFF VALVE WITH EXCESS FLOW

(71) Applicant: EMERSON PROCESS MANAGEMENT REGULATOR TECHNOLOGIES, INC., McKinney, TX (US)

(72) Inventors: Roy R. Pelfrey, Sherman, TX (US); Juan M. Diaz, Melissa, TX (US); Nadim Ahmed, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 15/144,201

(22) Filed: May 2, 2016

(65) Prior Publication Data
US 2016/0319942 A1 Nov. 3, 2016

Related U.S. Application Data

(60) Provisional application No. 62/155,548, filed on May 1, 2015.

(51) Int. Cl.
*F16K 17/26* (2006.01)
*F16K 51/00* (2006.01)
(Continued)

(52) U.S. Cl.
CPC ............... *F16K 1/12* (2013.01); *F16K 17/30* (2013.01); *F16K 27/02* (2013.01); *Y10T 137/6065* (2015.04); *Y10T 137/7772* (2015.04)

(58) Field of Classification Search
CPC . F16K 1/12; F16K 17/30; F16K 27/02; Y10T 137/7726; Y10T 137/7727;
(Continued)

(56) References Cited

U.S. PATENT DOCUMENTS

| 21,535 A | * | 9/1858 | Hardy et al. | ............ F16K 17/19 |
| | | | | 137/493.2 |
| 256,237 A | * | 4/1882 | Mickelborough | ........ F16K 5/00 |
| | | | | 137/315.01 |

(Continued)

FOREIGN PATENT DOCUMENTS

| DE | 1257506 B | 12/1967 |
| DE | 1258618 B | 1/1968 |

OTHER PUBLICATIONS

Search Report for International application No. PCT/US2016/030375, dated Aug. 23, 2016.
(Continued)

*Primary Examiner* — Jessica Cahill
(74) *Attorney, Agent, or Firm* — Marshall, Gerstein & Borun LLP

(57) ABSTRACT

An in-line serviceable cutoff valve with excess flow capability includes a valve body and a separable cover. Internal valve components are accessible for service or replacement when the separable cover is removed from the valve body. The internal valve components may optionally be attached to the separable cover so that the separable cover and the internal valve components may be removed as a single assembly.

14 Claims, 7 Drawing Sheets

(51) Int. Cl.
*F16K 1/12* (2006.01)
*F16K 17/30* (2006.01)
*F16K 27/02* (2006.01)

(58) Field of Classification Search
CPC ......... Y10T 137/7728; Y10T 137/6065; Y10T 137/7772; Y10T 137/7773; Y10T 137/7774
See application file for complete search history.

(56) References Cited

U.S. PATENT DOCUMENTS

| | | | |
|---|---|---|---|
| 1,441,784 A | | 1/1923 | Clayton |
| 2,844,164 A | | 7/1958 | Robbins |
| 3,035,595 A | | 5/1962 | Beason |
| 3,144,039 A | * | 8/1964 | Bloomquist ............... F16K 1/12 137/222 |
| 3,631,893 A | | 1/1972 | Seaman et al. |
| 3,863,668 A | | 2/1975 | Waters et al. |
| 3,924,649 A | * | 12/1975 | Totman ................... F16L 23/02 137/15.09 |
| 4,438,861 A | * | 3/1984 | McGuffey .............. B65D 90/34 137/216 |
| 5,287,841 A | * | 2/1994 | Forsythe ............ F02M 37/0023 123/510 |
| 6,308,730 B1 | * | 10/2001 | Schulze .................. F16K 17/30 137/459 |
| 6,401,741 B1 | * | 6/2002 | Cain ....................... F16K 17/32 137/10 |
| 8,254,462 B2 | * | 8/2012 | Schoner ................. H04N 5/142 348/448 |
| 9,574,672 B2 | * | 2/2017 | Lin ........................... F16K 7/12 |
| 2010/0084029 A1 | | 4/2010 | Lin et al. |
| 2010/0084594 A1 | * | 4/2010 | Lin ......................... F16K 1/126 251/291 |
| 2010/0252770 A1 | | 10/2010 | Lin et al. |
| 2016/0069463 A1 | * | 3/2016 | Roberts .................. F16K 17/10 137/78.1 |

OTHER PUBLICATIONS

Written Opinion for International application No. PCT/US2016/030375, dated Aug. 23, 2016.

* cited by examiner

IN-LINE SERVICABLE SHUTOFF VALVE WITH EXCESS FLOW

FIELD OF THE DISCLOSURE

The present disclosure generally relates to stop valves in pressurized tanks that contain flammable liquid or gas (or a combination of flammable liquid and gas), and more specifically to in-line stop valves that have an excess flow capability.

BACKGROUND

Transportation of pressurized chemicals is usually conducted through pipelines or by tanker vehicles. When tanker vehicles, such as tanker trucks, tanker aircraft, or tanker ships, move pressurized chemicals from an origin to a destination, the pressurized chemicals must be uploaded to the tanker vehicle at the origin and downloaded from the tanker vehicle to a storage device at the destination. Generally, a pipeline arrangement is used to transfer chemicals from or to the tanker vehicles, with the pump or compressor providing power to move the chemicals from one point to another.

Transportation of pressurized chemicals is particularly prevalent in the liquid petro-chemical industry, more particularly, in the propane, anhydrous ammonia, and liquefied natural gas (LNG) industry. Local and national regulations dictate that storage tanks for the liquefied chemicals, whether stationary or vehicle mounted, must have self-closing stop valves to prevent unintentional leaking of the chemicals to the environment.

In the propane industry, the stop valves are typically mounted at least partially within the storage tank (e.g., the valve inlet is disposed within the storage tank). Such a mounting scenario is possible because of the single wall tanks used to store the propane.

Liquefied natural gas and other cryogenic temperature (−238° F./−150° C. or less) chemicals are usually insulated with double wall storage tanks due to the low temperatures. The traditional stop valves cannot be attached to these liquefied natural gas tanks because of the insulation requirements. As a result, gate valves or ball valves are typically mounted in-line with transportation piping in liquefied natural gas systems. While these gate valves or ball valves can adequately perform a shut-off function during a fire, they lack an automatic shutoff capability when there is leakage downstream of the valve due to pipe failure. They also lack an automatic pressure equalizing capability for vaporized gas that gets trapped downstream of the valve.

Finally, ball and gate transfer valves for liquefied natural gas storage tanks must include heavy protective cages to prevent inadvertent loss of gas in a spill because of valve or pipeline failure in the case of external impact or accidents (such as tank rollover) that may affect valve integrity. These heavy protective cages are regulatory safety requirements.

DETAILED DESCRIPTION

Figure 1:
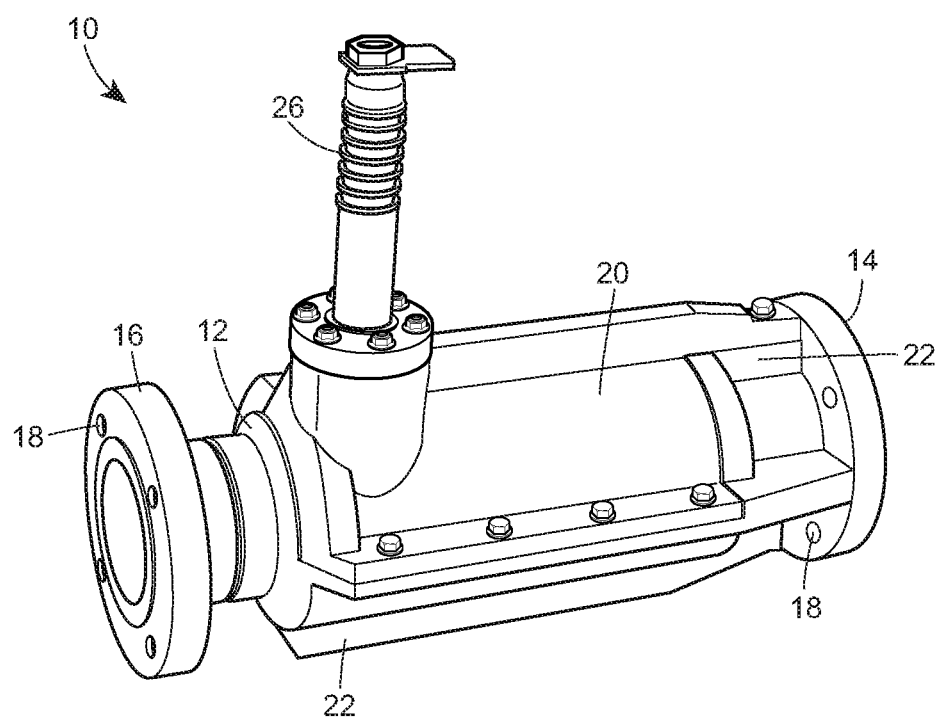
FIG. 1 is a front perspective view of an in-line serviceable shutoff valve with excess flow capability that is constructed in accordance with the teachings of the disclosure.
Figure 2:
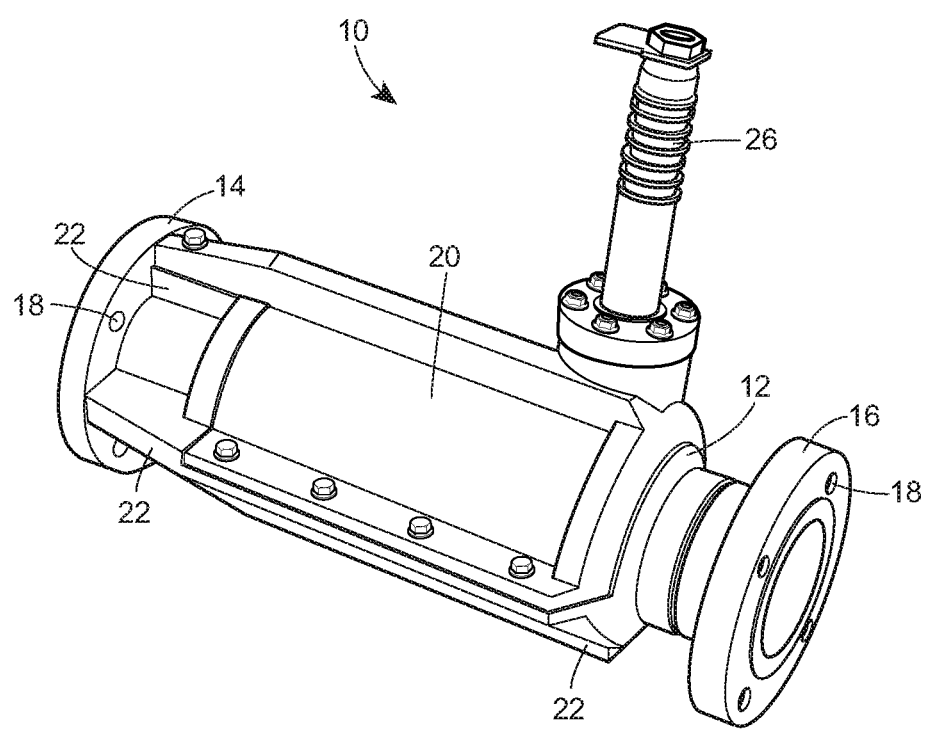
FIG. 2 is another perspective view of the in-line shutoff valve of FIG. 1.

Turning now to FIGS. 1 and 2, an in-line serviceable shutoff valve with excess flow capability 10 is illustrated. The valve 10 includes a valve body 12 that terminates at one end at an inlet connection 14 and at the other end at an outlet connection 16. The inlet connection 14 is adapted to be connected to a flange of a pipeline (not shown) in an in-line configuration. Similarly, the outlet connection 16 is adapted to be connected to a flange of another pipeline (not shown) in an in-line configuration. In the embodiment illustrated in FIGS. 1-7, the inlet connection 14 and the outlet connection 16 each include a plurality of fastener openings 18 for receiving fasteners to connect with the pipeline flanges. Also in the embodiment illustrated in FIGS. 1-7, the inlet connection 14 and the outlet connection 16 have similar (or identical) diameters. In other embodiments, the inlet connection 14 and the outlet connection 16 may have different diameters. In yet other embodiments, the inlet connection 14 and the outlet connection 16 may be welded, or otherwise secured, to the pipeline flanges without fasteners. Regardless, one advantage of the valve 10 is that the valve body 12 does not need to be separated from the pipeline to service or replace internal valve components. Servicing or replacement of internal valve components may be made by removing a separable cover 20, which exposes the internal valve components.

The valve body 12 may include one or more longitudinal gussets 22 disposed about a periphery of the valve body. The gussets 22 strengthen the valve body 12 and also may optionally form attachment points for the separable cover 20.

The valve body 12 may also include a bonnet 26 for securing valve control lever or external actuator. In cryogenic applications, such as the storage and transfer of liquefied natural gas, the bonnet 26 may be relatively long, as illustrated in FIGS. 1-7, to separate the gland packing and the control lever from the cold conditions within the valve body 12. However, the bonnet 26 may be shorter in non-cryogenic applications, such as the storage and disposal of propane or other non-cryogenic gases and liquids.

Figure 3:
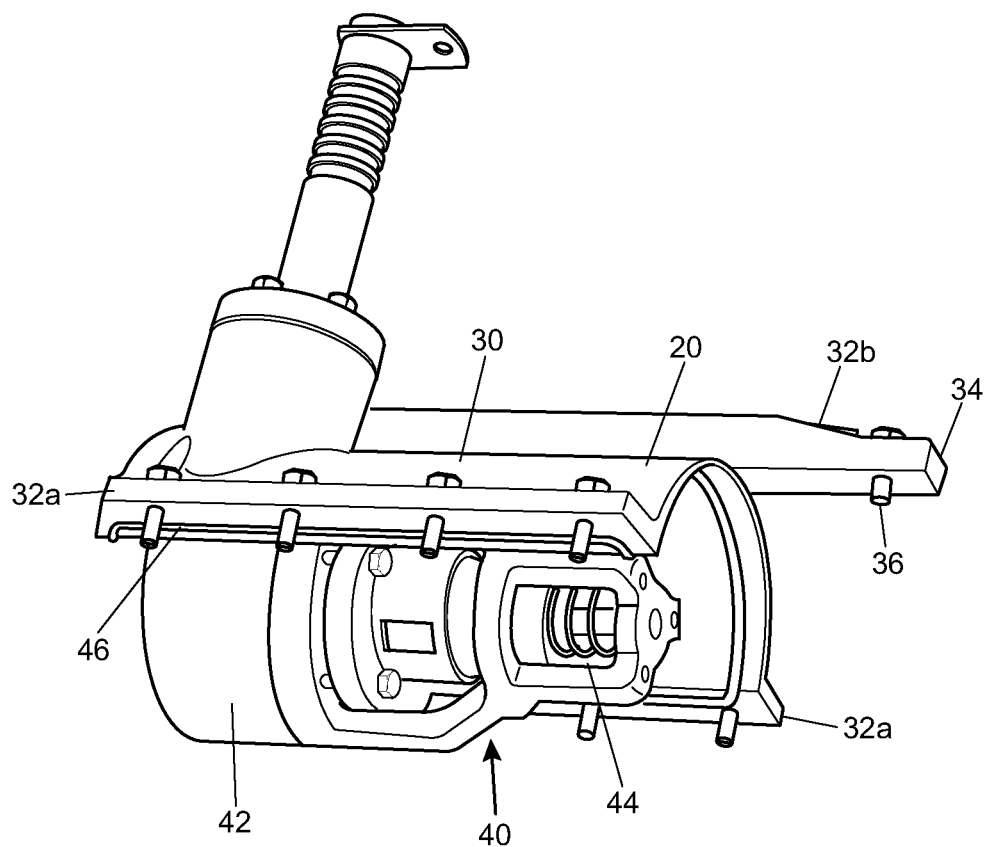
FIG. 3 is a bottom perspective view of a removable cover and internal components of the in-line shutoff valve of FIGS. 1 and 2.
Figure 4:
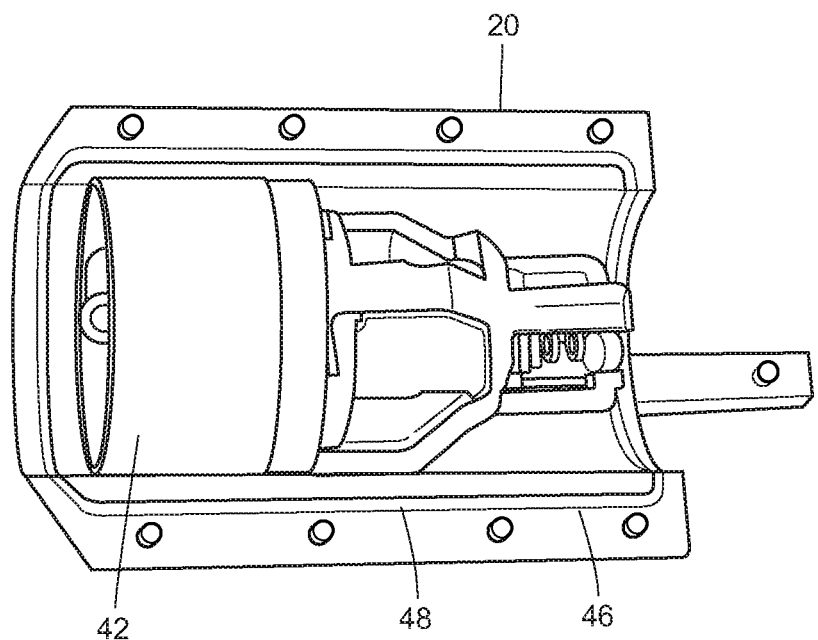
FIG. 4 is a bottom plan view of the removable cover and internal components of FIG. 3.

Turning now to FIGS. 3 and 4, the separable cover 20 is illustrated removed from the valve body 12. The separable cover 20 includes a cover body 30 having a half cylinder shape. A plurality of cover body gussets 32 extend longitudinally along the cover body 30. A first cover body gusset 32a may mate with the valve body gussets 22 (FIG. 2) to secure the cover body 30 to the valve body 12. A second cover body gusset 32b may extend longitudinally along the cover body 30 between the cover body gussets 32a. The second cover body gusset 32b may extend outward beyond the cover body 30 at one end and may be adapted to be secured directly to the valve body 12 at a securing end 34. A fastener 36 may extend through the cover body gusset 32b and into the valve body 12.

Internal valve components 40 may be secured to an inner surface of the cover body 30 so that the internal valve components 40 remain attached to the cover body 30 when the cover body 30 is removed from the valve body 12. In this manner, the inner valve components 40 may be serviced or replaced without separating the valve body 12 from the pipeline. The inner valve components 40 may be partially housed in an inner body extension 42 that is located downstream of the valve actuator 44. In one embodiment, the inner body extension 42 may be integrally formed with the cover body 30. In other embodiments, the inner body extension 42 and the cover body 30 may be separate components that are secured to one another. In yet other embodiments, the inner body extension 42 and the cover body 30 may be separate components that are not secured to one another so that the inner body extension 42 and the inner valve components 40 remain in the valve body 12 when the cover body 30 is removed.

An inner surface of the cover body 30 may include a channel 46 that is configured to receive a seal 48. The seal 48 seals the cover body 30 with the valve body 12 when the separable cover 20 is secured to the valve body 12.

Figure 5:
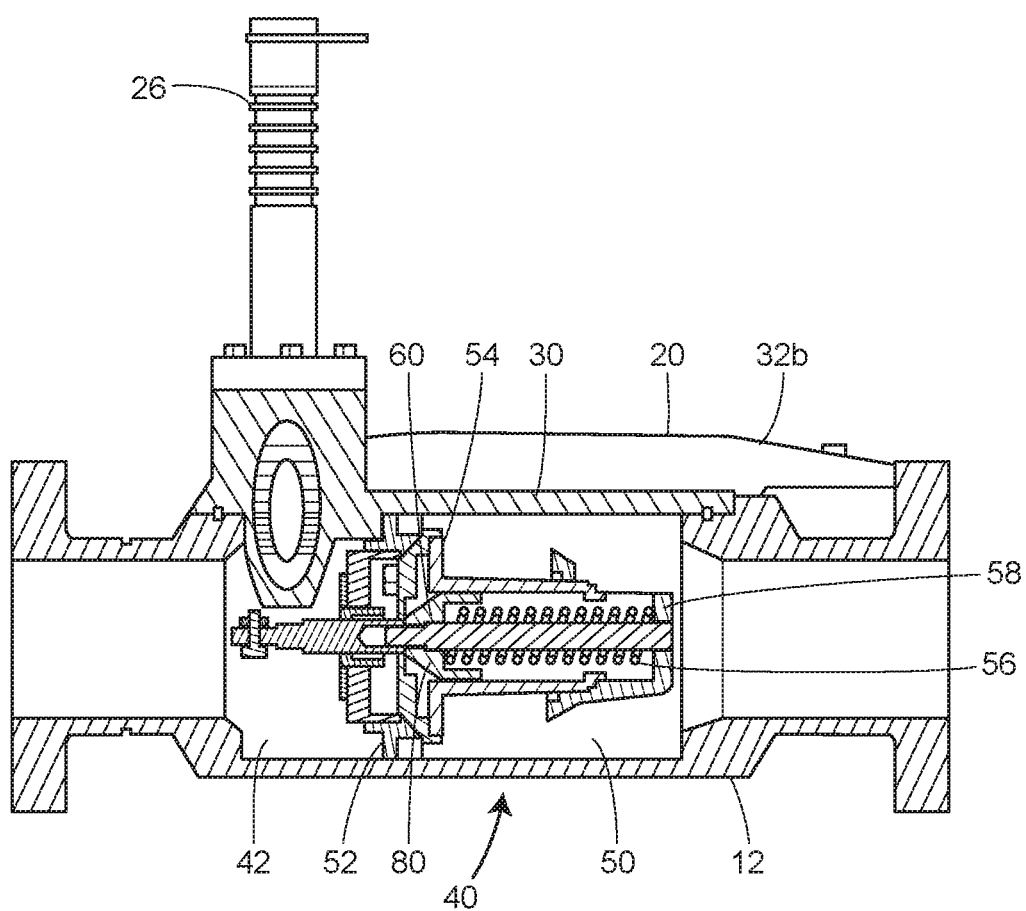
FIG. 5 is a side cross-sectional view of the in-line shutoff valve of FIG. 1.

Turning now to FIG. 5, the primary fluid flow direction being from right to left in FIG. 5, the inner body extension 42 may be at least partially seated within a receiving recess 50 formed in an inner surface of the valve body 12. The internal valve components 40 may include a valve seat 52 disposed within the inner body extension 42. A valve plug 54 is longitudinally movable relative to the valve seat 52 to control fluid flow through the valve body 12. A set spring 56 biases the valve plug 54 to a closed position in which the valve plug 54 contacts the valve seat 52 to prevent fluid flow through the valve body 12. The set spring 56 is seated between a first fixed spring seat 58 and a second spring seat 60 that is connected to the valve plug 54. The control lever 26 extends through the bonnet 24 and actuates the valve plug 54 between the closed position and an open position in which the valve plug 54 is spaced apart from the valve seat 52, thereby allowing fluid to flow through the valve body 12.

The disclosed in-line serviceable valve 10 advantageously includes an excess flow capability. More specifically, the valve 10 automatically closes in the event that fluid flow exceeds a predetermined limit. More specifically, when the valve plug 54 is in the open position and fluid flow exceeds a predetermined limit, the fluid flowing past the valve plug 54 will begin to push on the outer radial edges of the valve plug 54 until the fluid pressure forces the valve plug 54 back into contact with the valve seat 52. At this point, a central poppet 80 is held open by the mechanical linkage with the control lever so that a small amount of fluid may flow through the center of the seat 52, which allows pressure equalization once downstream pressure is re-gained, thereby allowing the valve plug 54 to re-open.

The disclosed in-line serviceable valve 10 also advantageously includes downstream excess pressure vent capability that returns downstream fluid to the tank (upstream of the valve) in the event of excess fluid pressure downstream. More specifically, when the valve plug 54 is in the closed position, any fluid trapped downstream of the valve seat 52 may vent back through the valve seat 52 into the tank upstream of the valve 10. When fluid (usually in a liquid form) gets trapped downstream of the valve seat 52, the liquid may vaporize due to warmer temperatures downstream of the valve 10. As the liquid vaporizes, pressure builds up to the point at which pressure downstream of the valve seat 52 overcomes the bias produced by the set spring 56. Fluid then flows back, through the valve seat 52 until pressure is equalized between downstream and upstream of the valve seat 52. At that point, the bias produced by the set spring 56 closes the valve plug 54. This excess flow and automatic relief of downstream pressure feature is a safety feature not possible with gate and globe valves, which typically require additional T lines with pressure relief valves connected to the downstream piping.

Figure 6:
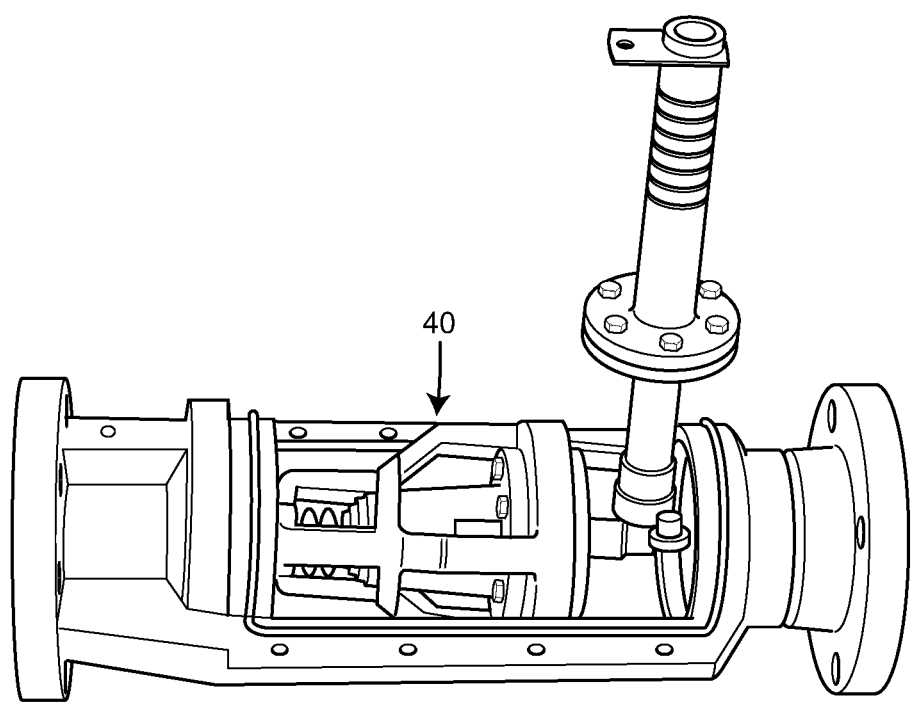
FIG. 6 is a top plan view of the in-line shutoff valve of FIG. 1 with the removable cover removed.

FIG. 6 illustrates the valve 10 with the separable cover 20 removed and the internal valve components 40 remaining inside the valve body 12. In this embodiment, the internal valve components 40 are easily accessible with the separable cover 20 removed, but the internal valve components 40 are not attached to the separable cover 20.

Figure 7:
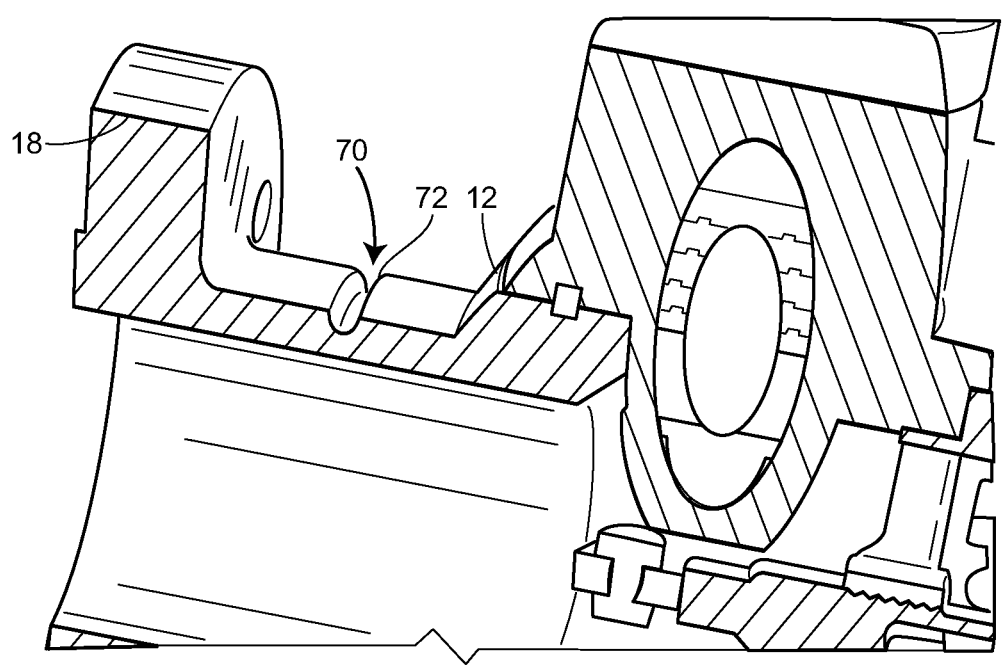
FIG. 7 is a close-up cross-sectional view of a break-away shearing portion of the in-line shutoff valve of FIG. 1.

FIG. 7 illustrates an advantageous break-away safety mechanism 70. The break-away safety mechanism 70 in this embodiment is an area of the valve body 12 that is locally weaker in tension than the rest of the valve body 12. In particular, the break-away safety mechanism 70 is formed as a channel 72 that extends circumferentially around the valve body 12 between the outlet connection 18 and the bonnet 24. The channel 72 focuses tensile stresses so that the valve body 12 fails in the region of the channel 72 before failing at any other location. Thus, the internal valve components 40 remain intact when the valve body 12 fails and the valve 10 may only require a small (or no) protective caging, given the excess flow protection, thereby eliminating the full-size cage used in current installations, which are intended to protect all adjacent valving, in accordance with regulatory requirements. The break-away safety mechanism 70 may take on other forms in other embodiments. For example, in other embodiments the break-away safety mechanism 70 may be formed as a gradually thinning portion of the valve body 12, the break-away safety mechanism 70 may be formed from a different, weaker material, or the break-away safety mechanism 70 may be formed by using mounting studs with notches or grooves to provide a primary failure location.

The disclosed in-line serviceable shutoff valve acts as a control and safety device for the transfer of liquefied chemicals. The disclosed in-line serviceable shutoff valve advantageously may bring transfer equipment into compliance with local safety regulations, such as DOT regulation 49 CFR, NFPA 59A, and ADR. Additionally, the disclosed in-line serviceable shutoff valve may be field substituted for current in-line shutoff valves.

In light of the foregoing, the description of the present disclosure should be understood as merely providing examples of the present invention and, thus, variations that do not depart from the gist of the invention are intended to be within the scope of the invention.

What is claimed:

1. An in-line serviceable shutoff valve comprising:
   a valve body having a fluid inlet and a fluid outlet;
   a valve seat disposed within the valve body between the fluid inlet and the fluid outlet; and
   a valve plug disposed within the valve body between the fluid inlet and the fluid outlet, the valve plug cooperating with the valve seat to control fluid flow through the valve body,
   wherein a separable cover is attached to the valve body, the separable cover including a cover body and a longitudinal external gusset that extends outward from the cover body and longitudinally along the cover body beyond one end of the cover body, and when the separable cover is removed from the valve body, internal components of the valve are accessible for servicing.

2. The valve of claim 1, wherein the valve body includes an external gusset.

3. The valve of claim 1, wherein the fluid inlet and the fluid outlet include attachment flanges.

4. The valve of claim 1, wherein internal valve components are attached to an inner surface of the cover body.

5. The valve of claim 4, wherein the internal valve components are at least partially disposed within an inner body extension that is attached to the cover body.

6. The valve of claim 5, wherein the inner body extension is at least partially disposed within a recess formed in an inner surface of the valve body.

7. The valve of claim 4, wherein the internal valve components include the valve seat, the valve plug, and a central poppet disposed within the valve plug.

8. The valve of claim 7, wherein the valve plug is biased towards the valve seat by a set spring, and when the valve plug is in the open position and fluid flow through the valve body exceeds a predetermined flow rate, the valve plug moves towards the closed position while the central poppet remains open.

9. The valve of claim 8, wherein the valve plug allows fluid to flow in a reverse direction when fluid pressure downstream of the valve seat exceeds a predetermined value.

10. The valve of claim 1, wherein the separable cover includes a bonnet.

11. The valve of claim 10, wherein the bonnet includes a control lever.

12. The valve of claim 1, further comprising a break-away safety mechanism.

13. The valve of claim 12, wherein the break-away safety mechanism is a circumferential channel on the valve body.

14. The valve of claim 12, wherein the circumferential channel is disposed between the separable cover and an outlet connection and downstream of the valve seat.

\* \* \* \* \*

UNITED STATES PATENT AND TRADEMARK OFFICE
CERTIFICATE OF CORRECTION

PATENT NO. : 10,088,054 B2  
APPLICATION NO. : 15/144201  
DATED : October 2, 2018  
INVENTOR(S) : Roy R. Pelfrey et al.

Page 1 of 1

It is certified that error appears in the above-identified patent and that said Letters Patent is hereby corrected as shown below:

On the Title Page

Item (54), Line 1, "SERVICABLE" should be -- SERVICEABLE --.

Item (57), Line 1, "cutoff" should be -- shutoff --.

In the Specification

Column 1, Line 1, "SERVICABLE" should be -- SERVICEABLE --.

Column 4, Line 17, "outlet connection 18" should be -- outlet connection 16 --.

Signed and Sealed this  
Second Day of June, 2020

Andrei Iancu  
*Director of the United States Patent and Trademark Office*